United States Patent
Koenig et al.

[11] Patent Number: 5,987,698
[45] Date of Patent: Nov. 23, 1999

[54] APPARATUS FOR USE IN CUTTING OPERATIONS

[75] Inventors: Arthur S. Koenig, San Antonio; Victor Y. Gonzales, Von Ormy, both of Tex.

[73] Assignee: MDI Labs, Inc., San Antonio, Tex.

[21] Appl. No.: 08/796,879

[22] Filed: Feb. 7, 1997

[51] Int. Cl.⁶ .................................................. A47L 9/02
[52] U.S. Cl. ............................ 15/339; 15/415.1; 175/209
[58] Field of Search .................................. 15/339, 415.1; 175/209

[56] References Cited

U.S. PATENT DOCUMENTS

| | | | |
|---|---|---|---|
| 2,144,586 | 1/1939 | Kelley | 175/209 X |
| 2,590,958 | 4/1952 | Goodrich | 175/209 |
| 2,829,867 | 4/1958 | Brochetti | 175/209 |
| 2,859,940 | 11/1958 | Brochetti | 15/339 X |
| 3,946,818 | 3/1976 | Ek | 175/209 |
| 4,184,226 | 1/1980 | Loevenich | 15/415.1 |
| 4,372,401 | 2/1983 | Fischer | 175/209 |
| 5,660,240 | 8/1997 | Harms et al. | 175/209 |

FOREIGN PATENT DOCUMENTS

| | | | |
|---|---|---|---|
| 230252 | 11/1963 | Australia | 15/339 |

Primary Examiner—Chris K. Moore
Attorney, Agent, or Firm—Mark R. Wisner

[57] ABSTRACT

An apparatus for preventing the slinging of the slop, or slurry, which results from the use of liquids such as water during cutting, coring, or drilling operations on concrete and other strata. A shield fits around the cutting element and is positioned closely enough to a vacuum ring to effectively close off the area around the strata which is being cut or cored so as to contain the slop that is flung about by the cutting element. The vacuum ring is coupled to a wet/dry vacuum so that when a vacuum is applied into the area which is closed off around the strata which is being cut, the slop is suctioned into the vacuum ring and on through a hose into the vacuum.

24 Claims, 3 Drawing Sheets

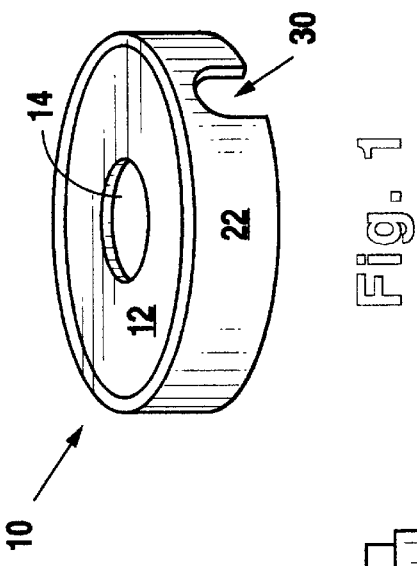
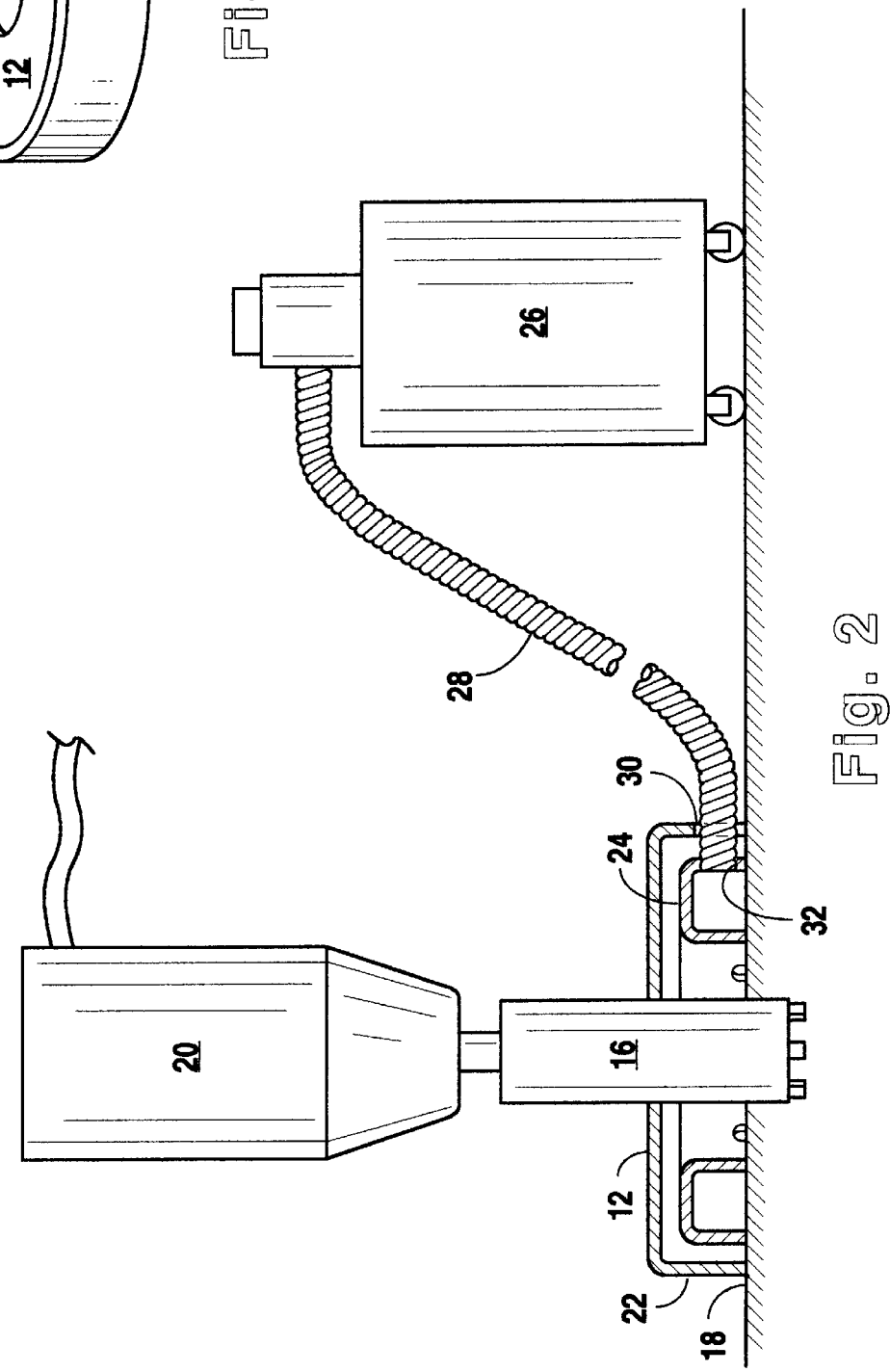

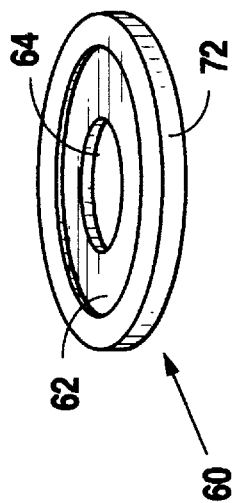
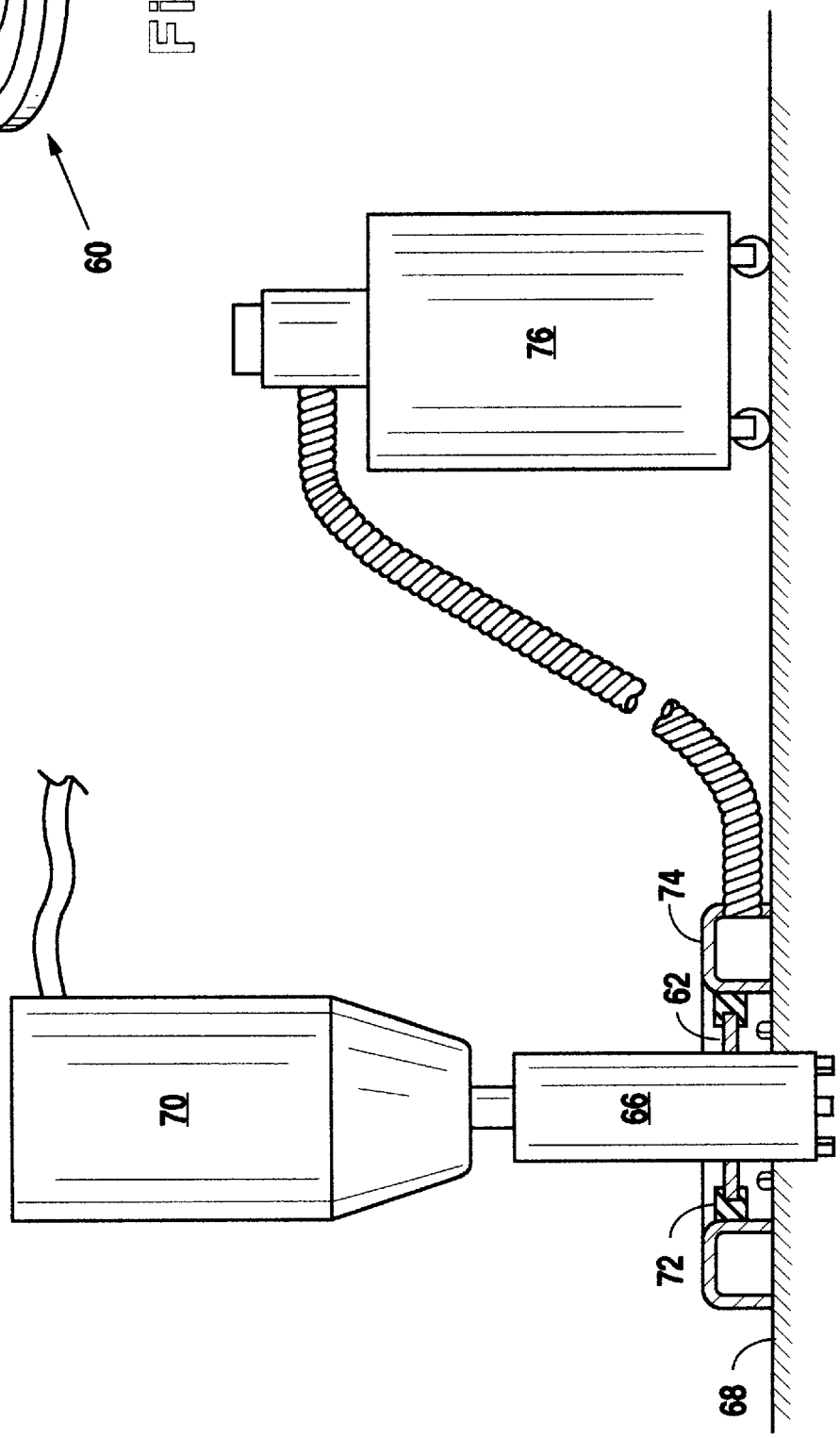

APPARATUS FOR USE IN CUTTING OPERATIONS

BACKGROUND OF THE INVENTION

The present invention relates to a shield for use during operations involving the coring or cutting of concrete or other materials. More particularly. the present invention relates to a shield for use in preventing the concrete cuttings from being thrown about during concrete cutting operations. One of the cutting operations that may be done is to cut or drill a hole in a slab. For example, U.S. Pat. No. 5,076,032 describes an apparatus and method for sampling the soil under a strata. As described in that patent, the first step in that method is to cut or drill a hole in a concrete slab. The hole is drilled with any of several commercially available concrete coring machines.

During this coring, operation, dust and small bits of concrete are cut and/or broken off from the strata and flung about by the coring bit. It is therefore desired for the protection of persons and property to prevent the small cuttings of concrete and dust from being thrown about. Further, sometimes water is used to cool the bit as it cuts such that the small bits of concrete are wetted and the result is a gray paste, or slurry, which is flung in all directions, including upwardly. This gray slurry is particularly persistent and difficult to remove from clothing and/or anything else which it contacts. Because the hole is often drilled inside a building. which can be a home, it is therefore highly desirable to prevent having this gray slurry be flung against walls, carpet, draperies, and other home furnishings.

It is therefore an object of the present invention to provide an apparatus for containing the concrete cuttings and dust or slurry which results from cutting operations. In a broader sense, it is an object of the present invention to provide an apparatus for preventing the forceful expulsion of the cuttings which result from the drilling or cutting of any strata, where the strata can be concrete, rock, caliche, clay, or any other material in which a cutting element such as a blade or bit is used. Further, it is an object of the present invention to prevent the forceful expulsion of the slurry of concrete cuttings and dust that results when a blade or bit is cooled and/or lubricated with a liquid in such cutting operations.

SUMMARY OF THE INVENTION

This object is achieved in the case of the present invention by providing an apparatus for containing the cuttings resulting from the cutting operations of a strata comprising a shield has hag a hole therethrough, the hole being sized to fit closely around the cutting element, and an annular member for resting on the strata to be cut which is sized to fit around the area in which the cutting operations are performed and which is positioned closely enough to the shield to resist the passage of any cuttings resulting from the cutting operations between the shield and the annular member. In a preferred embodiment, the annular member is provided with a fitting for receiving the hose of a vacuum for removing the cuttings or slurry from within the annular member.

BRIEF DESCRIPTION OF THE DRAWINGS

Referring now to the drawings,

FIG. 1 is a perspective view of one embodiment of an apparatus constructed in accordance with the present invention.

FIG. 2 is a side elevational view of the apparatus of FIG. 1 in operation during the cutting of a strata.

FIG. 5 is a perspective view of a third embodiment of an apparatus constructed in accordance with the present invention.

FIG. 6 is a side elevational view of the apparatus of FIG. 5 in operation during the cutting of a strata.

DETAILED DESCRIPTION OF THE INVENTION

Figure 3:
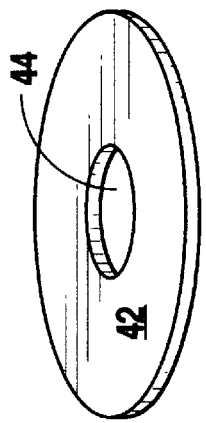
FIG. 3 is a perspective view of a second embodiment of an apparatus constructed in accordance with the present invention.

In more detail, and with specific reference to the figures, the construction and use of the present invention will now be described. Referring to FIGS. 1 and 2, a first embodiment of the invention is indicated generally at reference numeral 10. The apparatus 10 is comprised of a shield 12 having a hole 14 therethrough. To maximize the effectiveness in preventing the cuttings from operation of the drill bit, or coring bit, 16 from being flung radially outwardly and upwardly from the area in which the strata 18 is being cored, the hole 14 is sized to fit closely around the drill bit 16. Those skilled in the art who have the benefit of this disclosure will recognize that in referring to drill bit 16, reference is also being made to the shank of the bit 16 or any other portion of the cutting element with which the strata 18 is being cut, drilled, or cored, all of those operations being referred to generically herein as "cutting operations." It will also be recognized that the word "strata" is being used herein to refer to any material which may need to be cut, including cement, rock, composite materials, ceramics, clays, packed caliche or soils, or any mixture of such materials. Further, it will also be recognized that the term "cuttings" when applied to the materials removed by the cutting operations includes concrete bits, rocks, dust, or slurry if water is used. Bit 16 is rotated by the drill 20 in a manner which is known in the art and which forms no part of the present invention.

Shield 12 is provided with a downwardly extending skirt 22 which is preferably continuous around shield 12 and which, in the embodiment shown in FIGS. 1 and 2, is integral with and extends generally along the same axis of the axis of the hole 14 through shield 12 to rest on the strata 18 during cutting operations. As shown in FIG. 2, the skirt 22 extends downwardly from the shield 12 far enough toward the surface of strata 18 and is positioned closely enough to the vacuum ring 24 so as to interact with the vacuum ring 24 to effectively close off the area around the cutting/drilling. Closing off the area around the strata to be cut in this manner effectively resists the passage of any cuttings or any slurry which results from the use of a liquid such as oil or water to cool the cutting element during the cutting operations.

Although rot shown, to more effectively close off the area in which the strata is being cut, the inside surface of the hole 14 may be provided with a gasket or an inwardly-extending brush which bears against the surface of the bit 16 or other cutting element during cutting operations. Because it is preferred that the shield 12 not rotate with bit 16, it is preferred that the gasket be comprised of a soft, compressible material which is just stiff enough to fill up most of the space between the bit 16 and the remain of hole 14. Alternatively, and as shown in FIGS. 3 and 4, the shield can be constructed in a manner which allows the shield to fit tightly around the bit such that bit and shield rotate together.

The vacuum ring 24 is of a type which is available commercially and which rests on the strata 18 around the area in which the cutting operations are performed and to which a vacuum is applied by a wet/dry vacuum 26 through the hose 28. Any cuttings or slurry which is trapped in the closed area around the area to in which cutting operations are conducted is removed into the annulus of the vacuum ring 24 by the suction provided by the vacuum 26 through a plurality of holes (not numbered) through the wall of the vacuum ring 24. Shield 12 is provided with a hole 30 for passage of the hose 28 from the vacuum ring 24 to vacuum 26 and the vacuum ring 24 is provided with a fitting 32 for coupling the hose 28 thereto.

Figure 4:
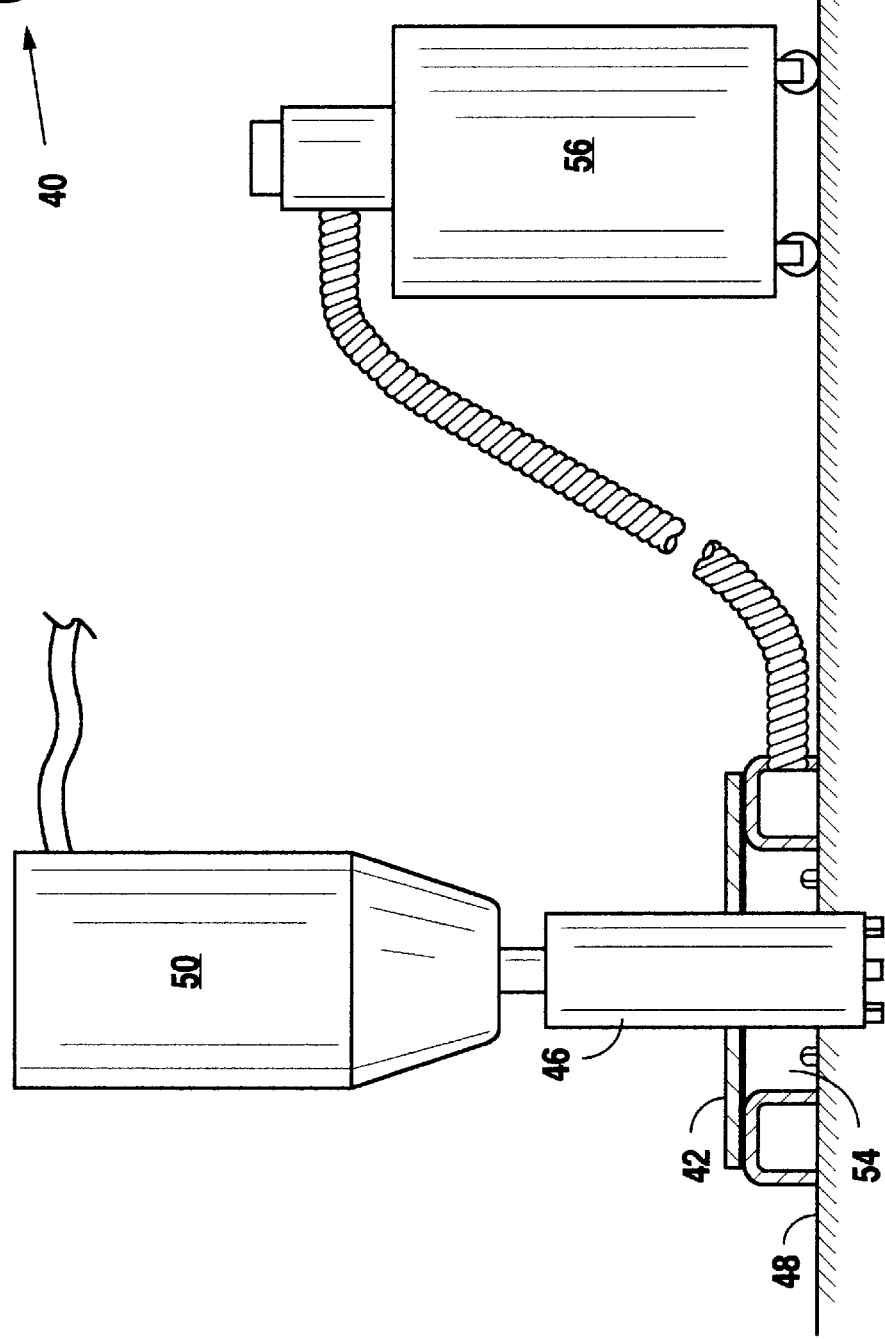
FIG. 4 is a side elevational view of the apparatus of FIG. 3 in operation during the cutting of a strata.

Referring now to FIGS. 3 and 4, a second embodiment of the apparatus of the present invention is shown. In this second embodiment, indicated generally at reference numeral 40, the shield 42 is sized to fit over and rest on top of vacuum ring 54. In this second embodiment, the shield 42 is provided with a hole 44 sized to fit around the cutting element, i.e., the bit 46, in the same manner as described above in connection with FIGS. 1 and 2. Alternatively, shield 42 fits tightly enough around bit 46 to turn with bit 46. Shield 42 may be comprised of a plastic or other resilient material having a plurality of short cuts (not shown) extending radially outwardly from the inside margin of the hole 44 which allow the shield 42 to be press fit onto bit 46. Because shield 42 is essentially flat and constructed of resilient material, the shield rides on the top surface of vacuum ring 54 without difficulty during cutting operations, thereby fitting closely enough over vacuum ring 54 to effectively close off the area around which strata 48 is being cut by the drill 50. During cutting operations, the cuttings that results from the use of liquid during cutting operations is vacuumed into vacuum ring 54 by the vacuum 56.

A third embodiment of the apparatus of the present invention is shown in FIGS. 5 and 6. In this third embodiment, indicated generally at reference numeral 60, a flexible shield 62 is sized to fit down inside the vacuum ring 74 and is provided with a casket. or ring, 72 for bearing against the inside surface of vacuum ring 74 to effectively close off the area around which the strata 68 is being cut or cored by the drill bit 66. In this manner, the flexible shield 62 is positioned closely enough to vacuum ring 74 to resist the passage of any slurry resulting from the use of liquid during cutting operations by drill 70 between shield 62 and vacuum ring 74. As was the case with the shield 12 shown in FIGS. 1 and 2, the flexible shield 62 is provided with a hole 64 through which the bit 66 extends, the hole 64 being sized to fit closely around bit 66 to resist the passage of slurry therebetween. The flexible shield enables maneuverability of the bit or cutting element.

Although described in terms of the above-illustrated presently preferred embodiments, those skilled in the art who have the benefit of this description will recognize that many changes can be made to the component parts of the apparatus without changing the manner in which those parts function to achieve their intended result. For instance, the skirt 22 of the shield 12 need not be rigid and/or integral with shield 12 and may instead be made of a flexible material, preferably a rubber or synthetic material, which is bonded to the periphery of shield 12 and drapes around the vacuum ring 24. Similarly, this skirt may be a circumferential brush, the bristles of which extend downwardly around the periphery of vacuum ring 24. All such changes are intended to fall within the scope of the following claims.

What is claimed is:

1. Apparatus for containing the slurry resulting from the use of liquid during cutting operations performed on a strata comprising a shield having a hole therethrough, the hole being sized to fit closely around the element to be used for cutting operations, and a vacuum ring for resting on the strata, said vacuum ring being sized to fit around the area in which cutting operations are performed, said shield being positioned closely enough to said vacuum ring to resist passage of slurry resulting from the use of liquid during the cutting operations on the strata between said shield and said vacuum ring.

2. The apparatus of claim 1 wherein said vacuum ring is provided with a fitting for receiving the hose of a vacuum for removing the slurry resulting from the use of liquid during cutting operations from within said vacuum ring.

3. The apparatus of claim 2 wherein said shield includes an outer wall which extends around said vacuum ring having an opening for passage of the hose therethrough.

4. The apparatus of claim 1 wherein said shield rests on said vacuum ring for sliding over said vacuum ring as the cutting element is moved in the area in which the cutting operations are performed.

5. The apparatus of claim 1 wherein said shield includes a skirt which extends around said vacuum ring.

6. The apparatus of claim 1 additionally comprising means formed around the opening in said shield for bearing against the cutting element during cutting operations for resisting the passage of any slurry resulting from the use of liquid during cutting operations therebetween.

7. An apparatus for containing the cuttings resulting from cutting operations on a strata comprising a shield having an opening therethrough, the opening being sized to fit closely to the element to be used for the cutting operation, and a ring adapted for resting on the strata, said ring being sized to fit around the area in which cutting operations are performed and having said shield positioned closely enough thereto to resist passage of cuttings resulting from the cutting operation between said shield and said ring while moving relative to said ring as the cutting element is moved in the area in which cutting operations are performed.

8. The apparatus of claim 7 wherein said shield includes a skirt which extends around said ring.

9. The apparatus of claim 7 additionally comprising means formed around the opening in said shield for bearing against the cutting element.

10. The apparatus of claim 7 wherein said ring is annular in shape.

11. The apparatus of claim 7 wherein said shield rests on said ring and slides over said ring as the cutting element is moved in the area in which the cutting operations are performed.

12. The apparatus of claim 7 wherein said shield is sized to fit down inside said ring.

13. An apparatus for containing the slurry resulting from the use of liquid during cutting operations on a strata comprising a shield having an opening therethrough, the opening being sized to fit closely to the element to be used for cutting operations, and an annular member adapted for resting on the strata, said annular member being sized to fit around the area in which the cutting operation is performed, said shield being positioned closely enough to said annular member to resist passage of slurry resulting from the use of liquid during the cutting operation on the strata between said shield and said annular member.

14. The apparatus of claim 13 wherein said annular member is provided with a fitting for receiving the hose of a vacuum for removing the slurry resulting from the use of liquid during the cutting operations from within said annular member.

15. The apparatus of claim 14 wherein said shield includes an outer wall which extends around said annular member having an opening for passage of the hose therethrough.

16. The apparatus of claim 13 wherein said shield rests on said annular member for sliding over said annular member as the cutting element is moved in the area in which the cutting operations are performed.

17. The apparatus of claim 13 wherein said shield includes a skirt which extends around said annular member.

18. The apparatus of claim 13 wherein said shield is sized to fit down inside said annular member.

19. The apparatus of claim 18 wherein the shield additionally comprises a gasket or ring for bearing against the inside surface of said annular member to effectively close off the area around the cutting operations.

20. The apparatus of claim 13 additionally comprising means formed around the opening in said shield for bearing against the cutting element during cutting operations for resisting the passage of any slurry.

21. An apparatus for containing the slurry resulting from the use of liquid during cutting operations performed on a strata comprising a shield having a hole therethrough, the hole being sized to fit closely around the element to be used for cutting operations, and a vacuum ring for resting on the strata, said vacuum ring being sized to fit around the area in which the cutting operations are performed, said shield being positioned closely enough to said vacuum ring to resist passage of slurry resulting from the use of liquid during the cutting operations between said shield and said vacuum ring and resting on said vacuum ring for sliding over said vacuum ring as the cutting element is moved in the area in which cutting operations are performed.

22. The apparatus of claim 21 wherein said vacuum ring is provided with a fitting for receiving the hose of a vacuum for removing cuttings resulting from the cutting operations from within said vacuum ring.

23. The apparatus of claim 21 wherein said shield includes a skirt which extends around said vacuum ring.

24. The apparatus of claim 21 additionally comprising means formed around the opening in said shield for bearing against the cutting element during cutting operations for resisting the passage of any cuttings resulting from cutting operations therebetween.

* * * * *